(12) United States Patent
Lim et al.

(10) Patent No.: US 7,680,613 B2
(45) Date of Patent: Mar. 16, 2010

(54) BATTERY MANAGEMENT SYSTEM (BMS) AND DRIVING METHOD THEREOF

(75) Inventors: Gye-Jong Lim, Suwon-si (KR);
Soo-Seok Choi, Suwon-si (KR);
Young-Jo Lee, Suwon-si (KR);
Yong-Jun Tae, Suwon-si (KR);
Han-Seok Yun, Suwon-si (KR);
Se-Wook Seo, Suwon-si (KR);
Beom-Gyu Kim, Suwon-si (KR);
Ho-Young Park, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/882,466

(22) Filed: Aug. 1, 2007

(65) Prior Publication Data

US 2008/0091364 A1    Apr. 17, 2008

(30) Foreign Application Priority Data

Oct. 16, 2006   (KR) .................. 10-2006-0100473

(51) Int. Cl.
*G01R 31/36* (2006.01)
*H02J 7/00* (2006.01)
(52) U.S. Cl. ..................................... 702/63; 320/130
(58) Field of Classification Search ............. 702/63, 702/64, 65; 324/426, 428, 430; 320/130, 320/132, 134
See application file for complete search history.

(56) References Cited

U.S. PATENT DOCUMENTS

| | | | |
|---|---|---|---|
| 5,153,496 A | 10/1992 | LaForge | |
| 5,321,627 A | 6/1994 | Reher | |
| 5,666,040 A | 9/1997 | Bourbeau | |
| 5,701,068 A | 12/1997 | Baer et al. | |
| 5,773,959 A | 6/1998 | Merritt et al. | |
| 5,773,962 A | 6/1998 | Nor | |

(Continued)

FOREIGN PATENT DOCUMENTS

CN    1415973    5/2003

(Continued)

OTHER PUBLICATIONS

U.S. Appl. No. 11/882,464, filed Aug. 1, 2007, Lim et al.

(Continued)

*Primary Examiner*—Bryan Bui
(74) *Attorney, Agent, or Firm*—Robert E. Bushnell, Esq.

(57) ABSTRACT

A Battery Management System (BMS) includes a sensing unit and a Micro Control Unit (MCU). The sensing unit measures a battery current, a battery voltage, and a battery temperature. The MCU determines a State of Charge (SOC) reset point based on the measured battery current and voltage. The BMS determines a battery overcharge state using a current integration result after the SOC reset point is reached. The MCU includes an SOC calculator and a full charge determining unit. The SOC calculator transmits a present current integration value upon detecting the SOC reset point. The full charge determining unit receives the present current integration value, integrates the current using the measured battery current, and determines that the battery is being overcharged when the current integration value reaches a predetermined battery rating capacity.

9 Claims, 3 Drawing Sheets

U.S. PATENT DOCUMENTS

| | | | |
|---|---|---|---|
| 5,796,334 | A | 8/1998 | Chen et al. |
| 5,952,815 | A | 9/1999 | Rouillard et al. |
| 6,014,013 | A | 1/2000 | Suppanz et al. |
| 6,078,165 | A | 6/2000 | Ashtiani et al. |
| 6,104,166 | A | 8/2000 | Kikuchi et al. |
| 6,127,806 | A | 10/2000 | Tanjo et al. |
| 6,157,169 | A | 12/2000 | Lee |
| 6,255,826 | B1 | 7/2001 | Ohsawa et al. |
| 6,300,763 | B1 | 10/2001 | Kwok |
| 6,336,063 | B1 | 1/2002 | Lennevi |
| 6,377,030 | B1 | 4/2002 | Asao et al. |
| 6,411,063 | B1 | 6/2002 | Kouzu et al. |
| 6,472,880 | B2 | 10/2002 | Kang |
| 6,621,250 | B1 | 9/2003 | Ohkubo et al. |
| 6,639,409 | B2 | 10/2003 | Morimoto et al. |
| 6,803,766 | B2 | 10/2004 | Kobayashi et al. |
| 7,126,342 | B2 | 10/2006 | Iwabuchi et al. |
| 2001/0035737 | A1 | 11/2001 | Nakanishi et al. |
| 2002/0030494 | A1 | 3/2002 | Araki et al. |
| 2002/0113595 | A1 | 8/2002 | Sakai et al. |
| 2003/0025481 | A1 | 2/2003 | Bertness |
| 2003/0146737 | A1 | 8/2003 | Kadouchi et al. |
| 2003/0189419 | A1 | 10/2003 | Maki et al. |
| 2004/0109274 | A1 | 6/2004 | Sato |
| 2005/0156603 | A1 | 7/2005 | Lin et al. |
| 2005/0269991 | A1 | 12/2005 | Mitsui et al. |
| 2006/0028179 | A1 | 2/2006 | Yudahira et al. |
| 2006/0181245 | A1 | 8/2006 | Mizuno et al. |
| 2006/0202663 | A1 | 9/2006 | Cho et al. |
| 2007/0090802 | A1 | 4/2007 | Seo |
| 2007/0090803 | A1* | 4/2007 | Yun et al. .................. 320/128 |
| 2008/0077339 | A1* | 3/2008 | Seo et al. .................... 702/63 |

FOREIGN PATENT DOCUMENTS

| | | |
|---|---|---|
| CN | 1604383 | 4/2005 |
| EP | 0990913 | 4/2000 |
| EP | 1081499 | 3/2001 |
| EP | 1203964 | 5/2002 |
| EP | 1841003 | 10/2007 |
| JP | 6231806 | 8/1994 |
| JP | 11-160367 | 6/1999 |
| JP | 2000-069606 | 3/2000 |
| JP | 2000-134705 | 5/2000 |
| JP | 2000-217261 | 8/2000 |
| JP | 2000-228832 | 8/2000 |
| JP | 2000-324702 | 11/2000 |
| JP | 2000-340267 | 12/2000 |
| JP | 2000-357541 | 12/2000 |
| JP | 2001-086656 | 3/2001 |
| JP | 2001-116776 | 4/2001 |
| JP | 2002-042906 | 2/2002 |
| JP | 2002-199510 | 7/2002 |
| JP | 2003-084015 | 3/2003 |
| JP | 2003-134675 | 5/2003 |
| JP | 2004-079324 | 3/2004 |
| JP | 2004-180397 | 6/2004 |
| JP | 2004-222433 | 8/2004 |
| JP | 2005-269752 | 9/2005 |
| JP | 2006-047130 | 2/2006 |
| JP | 2006-014480 | 12/2006 |
| KR | 10-1992-0009697 | 2/1991 |
| KR | 10-1997-0048597 | 7/1997 |
| KR | 1998-064646 | 10/1998 |
| KR | 10-0216808 | 6/1999 |
| KR | 10-2001-0043872 | 5/2001 |
| KR | 10-2002-0064998 | 8/2002 |
| KR | 2003-0065757 | 8/2003 |
| KR | 10-2004-0005133 | 1/2004 |
| KR | 10-2004-0092943 | 11/2004 |
| KR | 10-2004-0111144 | 12/2004 |
| KR | 10-2005-0019856 | 3/2005 |
| KR | 10-2005-0026360 | 3/2005 |
| KR | 10-2005-0089816 | 9/2005 |
| KR | 10-0534818 | 12/2005 |
| KR | 10-2006-0059680 | 6/2006 |
| KR | 10-2006-0094897 | 8/2006 |
| KR | 10-2007-0003628 | 1/2007 |
| KR | 10-2007-0029937 | 3/2007 |
| KR | 10-2006-0079505 | 7/2008 |
| WO | 2007007655 | 1/2007 |

OTHER PUBLICATIONS

State of Change (Wikipedia 2pages) print out from http://en.wikipedia.org/wiki/Sate_of_change.

Custom Power Solutions (10 pages) print out from http://www.mpoweruk.com/soc.htm.

* cited by examiner

BATTERY MANAGEMENT SYSTEM (BMS) AND DRIVING METHOD THEREOF

CLAIM OF PRIORITY

This application makes reference to, incorporates the same herein, and claims all benefits accruing under 35 U.S.C. §119 from an application for BATTERY MANAGEMENT SYSTEM AND DRIVING METHOD THEREOF earlier filed in the Korean Intellectual Property Office on the 16 of Oct. 2006 and there duly assigned Serial No. 10-2006-0100473.

BACKGROUND OF THE INVENTION

1. Field of the Invention

The present invention relates to a Battery Management System (BMS). More particularly, the present invention relates to a BMS used in a vehicle using electrical energy.

2. Description of the Related Art

Vehicles with an internal combustion engine using gasoline or diesel fuel have caused serious air pollution. Accordingly, efforts have recently been made for developing electric or hybrid vehicles to reduce air pollution.

An electric vehicle uses a battery motor operating by electrical energy output by a battery. Since the electric vehicle mainly uses a battery formed by one battery pack including a plurality of rechargeable/dischargeable secondary cells, there is merit in that it produces no emission gases and less noise.

A hybrid vehicle commonly refers to a gasoline-electric hybrid vehicle that uses gasoline to power an internal-combustion engine and a battery to power an electric motor. Recently, hybrid vehicles using an internal-combustion engine and fuel cells and hybrid vehicles using a battery and fuel cells have been developed. The fuel cells directly obtain electrical energy by generating a chemical reaction while hydrogen and oxygen are continuously provided.

Since battery performance directly affects a vehicle using electrical energy, it is necessary for each battery cell to have exceptional performance. Also, it is necessary to provide a Battery Management System (BMS) to measure a voltage and a current of the battery pack to efficiently manage charging and discharging operations of each battery cell.

However, since a battery voltage and a threshold voltage range are compared to determine a battery overcharge, a battery may be continuously overcharged when a battery voltage detecting circuit has an error.

SUMMARY OF THE INVENTION

The present invention has been made in an effort to provide a Battery Management System (BMS) for protecting a battery by detecting a state of the battery when there is an error in a battery voltage detecting circuit, and more precisely for detecting a battery overcharge state, and a driving method thereof.

An exemplary Battery Management System (BMS) includes: a sensing unit to measure a battery current, a battery voltage, and a battery temperature; and a Micro Control Unit (MCU) to determine a State of Charge (SOC) reset point based on the measured battery current and voltage; the BMS determines a battery overcharge state based on a current integration result after the SOC reset point.

The SOC reset point preferably corresponds to the battery current and the battery voltage.

The MCU preferably includes: an SOC calculator to transmit a present current integration value in response to detecting the SOC reset point; and a full charge determining unit to receive the present current integration value, to integrate the current using the measured battery current, and to determine that the battery is being overcharged in response to a current integration value reaching a predetermined battery capacity rating.

The BMS preferably further includes a protection circuit to turn off a main switch to disconnect the battery from a power source in response to a determination that the battery is being overcharged.

An exemplary method of driving a Battery Management System (BMS) includes: detecting a State of Charge (SOC) reset point; integrating a measured battery current until a current integration value corresponding to the SOC reset point reaches a battery capacity rating in response to an SOC reset condition reaching the SOC reset point and a reset operation is required; comparing a current integration result and the battery capacity rating; and determining that a battery is being overcharged in response to the current integration result being equal to the battery capacity rating.

The method further preferably includes stopping charging of the battery in response to a determination that the battery is being overcharged.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
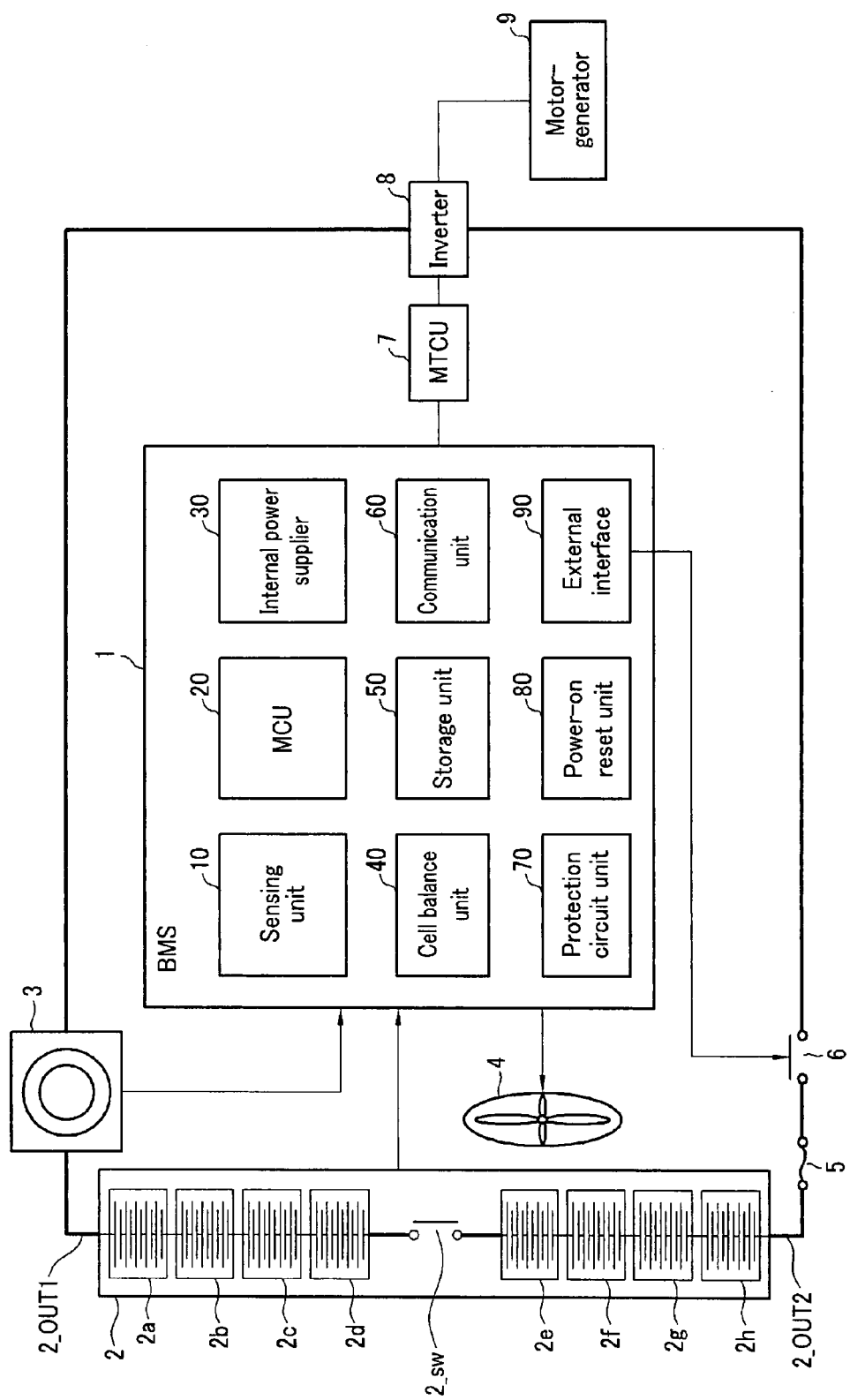
FIG. 1 is a block diagram of a battery, a Battery Management System (BMS), and peripheral devices of the BMS that may be used in a vehicle, according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise", and variations such as "comprises" or "comprising", will be understood to imply the inclusion of stated elements but not the exclusion of any other elements.

FIG. 1 is a block diagram of a configuration of a hybrid vehicle system according to an exemplary embodiment of the present invention.

As shown in FIG. 1, the hybrid electric vehicle system according to the first exemplary embodiment of the present invention includes a BMS 1, a battery 2, a current sensor 3, a cooling fan 4, a fuse 5, a main switch 6, a MoTor Control Unit (MTCU) 7, an inverter 8, and a motor generator 9.

The battery 2 includes a plurality of sub-packs 2a to 2h having a plurality of battery cells coupled in series to each other, an output terminal 2_OUT1, an output terminal 2_OUT2, and a safety switch 2_SW provided between the sub-pack 2d and the sub-pack 2e. While 8 sub-packs 2a to 2h are exemplified and each sub-pack is a group of a plurality of battery cells in the exemplary embodiment of the present invention, the present invention is not limited thereto. In addition, the safety switch 2_SW is manually turned on/off to guarantee the safety of a worker when performing operations on the battery or replacing the battery. In the exemplary embodiment of the present invention, the safety switch 2_SW is provided between the sub-pack 2d and the sub-pack 2e, but the present invention is not limited thereto. The output terminal 2_OUT1 and the output terminal 2_OUT2 are coupled to the inverter 8.

The current sensor 3 measures an output current value of the battery 2, and outputs the measured output current value to a sensing unit 10 of the BMS 1. In further detail, the current sensor 3 may be a hall current transformer using a hall element to measure a current value and outputting an analog current signal corresponding to the measured current value.

The cooling fan 4 removes heat generated by charging and discharging of the battery 2 in response to a control signal of the BMS 1, and prevents the battery 2 from being deteriorated by a temperature increase and prevents the charging and discharging efficiency from being deteriorated.

The fuse 5 prevents a current overflow, which may be caused by a disconnection or a short circuit of the battery 2, from being transmitted to the battery 2. That is, when an overcurrent is generated, the fuse 5 opens so as to interrupt the overcurrent from flowing.

The main switch 6 is turned off according to a control signal of the MTCU 7 of the vehicle when the battery is being overcharged or over-discharged, or when a high temperature is generated, and it interrupts a connection between the battery 2 and the motor-generator 9, which will be referred to as a "cut-off operation".

The BMS 1 includes a sensing unit 10, a Micro Control Unit (MCU) 20, an internal power supplier 30, a cell balance unit 40, a storage unit 50, a communication unit 60, a protection circuit unit 70, a power-on reset unit 80, and an external interface 90.

The sensing unit 10 measures a voltage of the battery and transmits it to the MCU 20. Hereinafter, charging and discharging currents of the battery will be referred to as a battery current. In addition, a voltage at an output terminal of the battery will be referred to as a battery voltage. Furthermore, the battery includes a plurality of cells, and a value obtained by measuring respective cell temperatures and calculating an average value of the respective cell temperature will be referred to as a battery temperature.

The MCU 20 detects a State of Charge (SOC) of the battery 2 based on the battery current and the battery voltage transmitted from the sensing unit 10, and generates information that indicates a state of the battery 2. Then, the MCU 20 transmits the generated information to the protection circuit unit 70. In this case, when an SOC reset condition is satisfied, the MCU 20 determines the battery overcharge by using a current integration value of the battery, and transmits a cut-off signal for controlling the SOC of the battery to the protection circuit unit 70. The SOC reset condition is based on the battery current, the battery voltage, the SOC, and the temperature.

The internal power supplier 30 supplies power to the BMS 1 by using a backup battery. The cell balance unit 40 balances the state of charge of each cell. That is, cells sufficiently charged are discharged, and cells relatively less charged are further charged. The storage unit 50 stores data of the current SOC and a current State of Health (SOH) when the power source of the BMS 1 is turned off. The communication unit 60 communicates with the MTCU 7 of the vehicle.

The protection circuit unit 70 determines the battery overcharge according to the cut-off signal for controlling the SOC, and prevents the battery 2 from being overcharged. In addition, the protection circuit unit 70 turns off the main switch 6 according to a battery overcharge determination result. Thus, a connection between the motor-generator 9 and the battery 2 is interrupted. According to the exemplary embodiment of the present invention, the power plant of the vehicle is the motor-generator 9.

The power-on reset unit 80 resets the overall system when the power source of the BMS 1 is turned on. The external interface 90 couples BMS auxiliary devices, such as the cooling fan 4 and the main switch 6, to the MCU 20. While the cooling fan 4 and the main switch 6 are shown for the BMS assistance devices in the exemplary embodiment of the present invention, the present invention is not limited thereto.

The MTCU 7 determines a torque state based on information of an accelerator, a brake, and a vehicle speed, and controls an output of the motor generator 9 so that the output corresponds to torque information. That is, the MTCU 7 controls a switching operation of the inverter 8, and controls the output of the motor generator 9 so that the output corresponds to the torque information. In addition, the MTCU 7 receives the SOC of the battery 2 from the MCU 20 through the communication unit 60, and controls the SOC level of the battery 2 to be a target level (e.g., 55%). For example, when the SOC level transmitted from the MCU 20 is lower than 55%, the MTCU 7 controls a switch of the inverter 8 so as to output power toward the battery 2 and charge the battery 2. In this case, the battery pack current I has a positive value (+). When the SOC level is greater than 55%, the MTCU 7 controls the switch of the inverter 8 to output the power toward the motor generator 9 and discharge the battery 2. In this case, the battery pack current I has a negative value (−).

The inverter 8 controls the battery 2 to be charged or discharged in response to the control signal of the MTCU 7. The motor generator 9 uses the electrical energy of the battery to drive the vehicle based on the torque information transmitted from the MTCU 7.

A voltage detecting process of the battery according to the exemplary embodiment of the present invention is described below with reference to FIG. 2 and FIG. 3.

Figure 2:
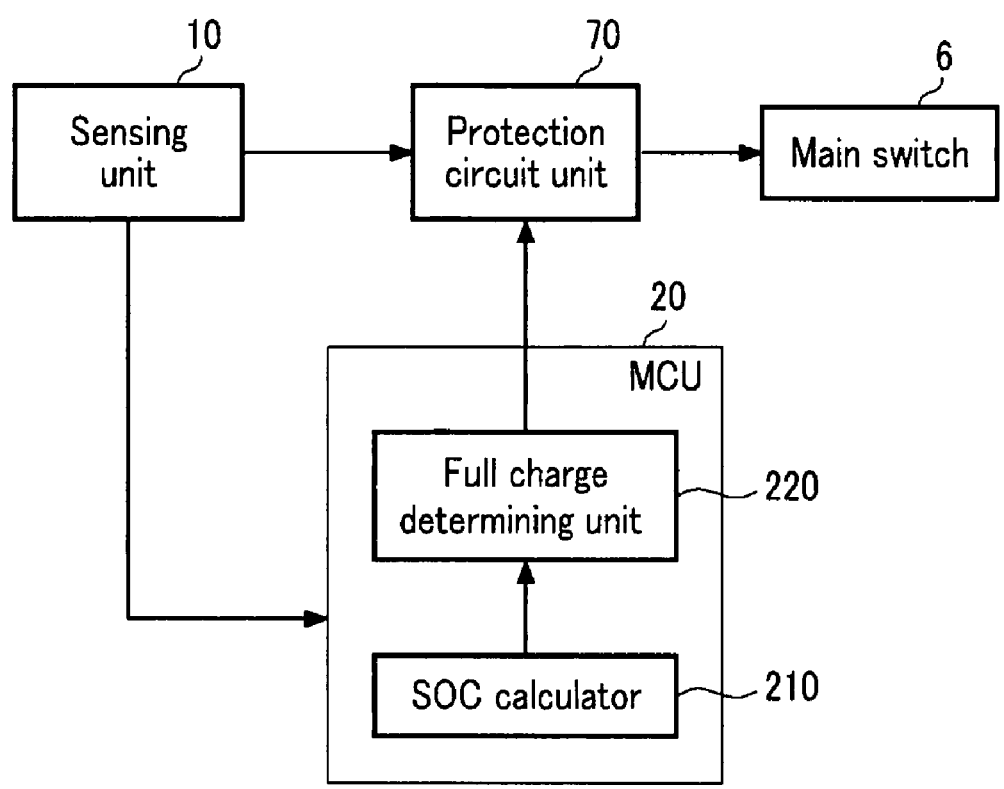
FIG. 2 is a block diagram of a Micro Control Unit (MCU) and a protection circuit unit of the BMS according to the exemplary embodiment of the present invention.
Figure 3:
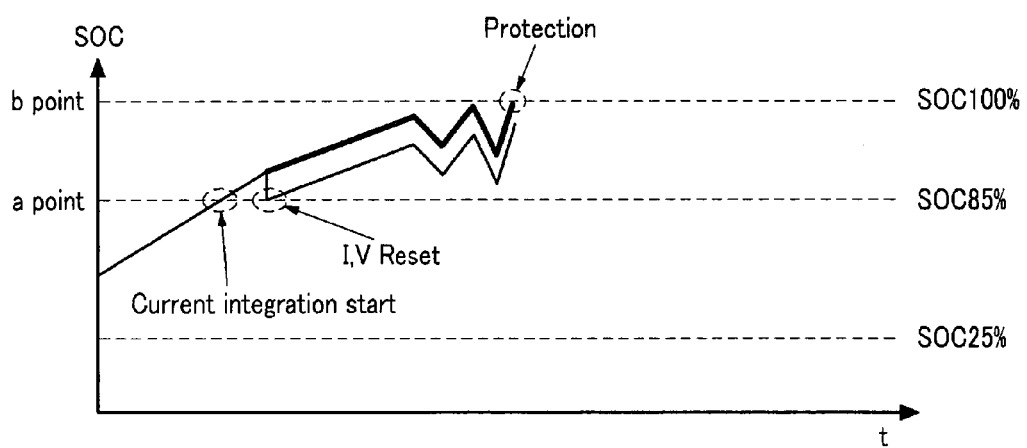
FIG. 3 is a waveform diagram of a relationship between time and a State of Charge (SOC).

FIG. 2 is a block diagram of the MCU 20 and the protection circuit unit 70 of the BMS according to the exemplary embodiment of the present invention.

As shown in FIG. 2, the MCU 20 includes an SOC calculator 210 and a full charge determining unit 220. FIG. 3 is a waveform diagram of a relationship between time and an SOC.

The SOC calculator 210 detects and determines the SOC reset condition, and transmits a present current integration value to the protection circuit unit 70 when a reset operation is required. The SOC calculator 210 according to the exemplary embodiment of the present invention calculates the SOC by integrating the battery current transmitted from the sensing unit 10, and detects the transmitted battery current, battery voltage, and temperature to determine whether they correspond to the SOC reset condition. As shown in FIG. 3, a point a where the SOC is 85% satisfies the SOC reset condition. At the point a, a current integration value is calculated by forcibly performing the reset operation to compensate foe an estimated error by the current integration. In addition, when the SOC reset condition exceeds a reset point, the SOC calculator 210 transmits the present current integration value to the full charge determining unit 220.

The full charge determining unit 220 receives the present current integration value, and integrates the current using the sensed battery current transmitted from the sensing unit 10. When the current integration value reaches a predetermined battery rating capacity, the full charge determining unit transmits the cut-off signal for controlling the SOC to the protection circuit unit 70. The battery capacity rating is the amount of discharged charges when the battery is fully charged and then discharged to a predetermined current 1C-rate. In addition, the 1C-rate is the intensity of current for charging or discharging the entire battery over a unit time. The full charge determining unit 220 according to the exemplary embodiment of the present invention receives the present current integration value from the SOC calculator 210, receives the sensed battery current from the sensing unit 10, and integrates the current to establish the current integration value. In addition, when the SOC reaches 100% at a point b as shown in FIG. 3 (i.e., the SOC reaches the battery capacity rating), the full charge determining unit 220 determines that the battery is overcharged, and transmits the cut-off signal for controlling the SOC to the protection circuit 70 to protect the battery.

The protection circuit unit 70 receives the cut-off signal from the full charge determining unit 220, and turns off the main switch 6, thereby disconnecting the motor-generator 9 from the battery.

According to the BMS relating to the battery protection method according to the exemplary embodiment of the present invention and the driving method thereof, the SOC is calculated, the battery current, the battery voltage, and the temperature are detected, and it is determined whether the SOC reset condition corresponds to the SOC reset point. When the reset condition is satisfied, the currents are integrated by using the present current integration value and the sensed battery current. When the calculated current integration value reaches the battery capacity rating, it is determined that the battery is overcharged, and the battery is protected.

While this invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

According to the exemplary embodiment of the present invention, the BMS for determining the battery overcharge by using the current integration value, and the driving method thereof are provided.

Accordingly, the BMS and the driving method thereof protect against battery voltage detecting circuit errors and a continuous battery overcharge caused by rapid battery voltage variations. In addition, the battery is safely and precisely prevented from being overcharged.

What is claimed is:

1. A Battery Management System (BMS), comprising:
    a sensing unit for measuring a battery current, a battery voltage, and a battery temperature; and
    a Micro Control Unit (MCU) for determining a State of Charge (SOC) reset point based on the measured battery current, battery voltage and battery temperature;
    wherein the BMS determines a battery overcharge state based on a current integration result after the SOC reset point.

2. The BMS of claim 1, wherein the SOC reset point corresponds to the battery current, the battery voltage and the battery temperature.

3. The BMS of claim 1, wherein the MCU comprises:
    an SOC calculator for transmitting a present current integration value in response to detecting the SOC reset point; and
    a full charge determining unit for receiving the present current integration value, for integrating the current using the measured battery current, and for determining that the battery is being overcharged in response to a current integration value reaching a predetermined battery capacity rating.

4. The BMS of claim 3, further comprising a protection circuit for turning off a main switch so as to disconnect the battery from a power source in response to a determination that the battery is being overcharged.

5. A method of driving a Battery Management System (BMS), the method comprising the steps of:
    detecting a State of Charge (SOC) reset point;
    integrating a measured battery current until a current integration value corresponding to the SOC reset point reaches a battery capacity rating in response to an SOC reset condition reaching the SOC reset point and a reset operation being required;
    comparing a current integration result and the battery capacity rating; and
    determining that a battery is being overcharged in response to the current integration result being equal to the battery capacity rating.

6. The method of claim 5, further comprising the step of stopping charging of the battery in response to a determination that the battery is being overcharged.

7. The BMS of claim 1, further comprising a protection circuit for turning off a main switch so as to disconnect the battery from a power source in response to a determination that the battery is being overcharged.

8. A Battery Management System (BMS), comprising:
    detecting means for detecting a State of Charge (SOC) reset point;
    integrating means for integrating a measured battery current until a current integration value corresponding to the SOC reset point reaches a battery capacity rating in response to an SOC reset condition reaching the SOC reset point and a reset operation being required;
    comparing means for comparing a current integration result and the battery capacity rating; and
    determining means for determining that a battery is being overcharged in response to the current integration result being equal to the battery capacity rating.

9. The BMS of claim 8, further comprising stopping means for stopping charging of the battery in response to a determination that the battery is being overcharged.

* * * * *